United States Patent [19]
Gertal

[11] 4,223,762
[45] Sep. 23, 1980

[54] OMNIDIRECTIONAL VIBRATION ISOLATING

[76] Inventor: Maurice Gertal, 75 Massasoit St., Waltham, Mass. 02154

[21] Appl. No.: 929,926

[22] Filed: Aug. 1, 1978

[51] Int. Cl.³ .......................... F16F 7/00; F16F 11/00
[52] U.S. Cl. ..................................... 188/1 B; 248/580; 248/621; 248/638; 267/122; 267/153; 267/182; 308/184 R; 308/230
[58] Field of Search ............ 267/153, 35, 65 B, 122, 267/141, 182, 152, 40.1, 40.5; 308/184 R, 230, 139; 248/580, 619, 621, 638; 188/1 B

[56] References Cited

U.S. PATENT DOCUMENTS

| 1,766,597 | 6/1930 | Bushnell | 248/638 X |
| 2,551,621 | 5/1951 | Michelsen | 308/184 X |
| 2,614,896 | 10/1952 | Pierce, Jr. | 308/184 R X |
| 3,128,978 | 4/1964 | Sykes | 267/153 X |

FOREIGN PATENT DOCUMENTS

| 1120809 | 4/1956 | France | 267/35 |
| 200452 | 7/1923 | United Kingdom | 308/184 R |
| 678809 | 9/1952 | United Kingdom | 267/153 |

Primary Examiner—George E. A. Halvosa
Attorney, Agent, or Firm—Charles Hieken

[57] ABSTRACT

In an air or gas spring having a metal cylinder with a rigid gas-tight closure at one end and a flexible convoluted diaphragm seal and piston at the other end, the piston has an inner floating member restrained vertically by hardened roller balls that ride in a hardened ball race and horizontally by elastomer spring material.

4 Claims, 3 Drawing Figures

OMNIDIRECTIONAL VIBRATION ISOLATING

BACKGROUND OF THE INVENTION

The present invention relates in general to vibration isolation and more particularly concerns novel apparatus and techniques for providing omnidirectional vibration isolaton with reliable apparatus that is relatively easy and inexpensive to manufacture while providing nearly complete isolation from vibration in all directons, thereby helping to solve a serious problem in connection with making low-level measurements.

A typical prior-art air or gas spring for vibration isolation comprises a metal cylinder with a rigid gas-tight closure at one end and a flexible convoluted diaphragm seal and piston at the other end. The spring action provided by the enclosed gas offers very low stiffness when the piston is displaced axially. Although the lateral (usually horizontal) stiffness afforded to the piston by the convolution of the diaphragm is lower than a typical solid elastomer seal, such as an O-ring, the convolution stiffness is sufficiently high relative to the low axial stiffness afforded by the enclosed gas that significant vibration may be transmitted through the prior-art support. Although many of these vibrations in the lateral direction may be so small that they cannot be felt, they are significant in certain applications where exceptionally lowlevel signals of interest are detected by transducers, such as in certain medical experiments. The transmitted lateral vibrations may produce a signal that seriously interferes with the signal sought to be measured.

Accordingly, it is an important object of this invention to provide improved apparatus and techniques for isolating vibration.

It is another object of the invention to achieve the preceding object while significantly reducing the transmission of lateral vibration.

It is still another object of the invention to achieve one or more of the preceding objects by modifying a conventional air or gas spring in a manner that is relatively free from complexity, relatively inexpensive, relatively easy to manufacture and highly effective in significantly reducing vibration too small to feel.

SUMMARY OF THE INVENTION

According to the invention, in an air or gas spring, the invention resides in apparatus comprising, floating member means for reducing vibration in a direction orthogonal to the axis of the spring, means for supporting said floating member means for restraining movement thereof in the direction of said axis with high stiffness many times greater than that of the spring while offering very low friction thereto in a direction orthogonal to said axis, and resilient means for restraining movement of said floating member orthogonal to said axis with low stiffness of the order of the spring stiffness. According to one aspect of the invention, the spring comprises a metal cylinder with a rigid gas-tight closure at one end and a flexible convoluted diaphragm seal and piston at the other end, and the improvement is seated in the piston. According to another aspect of the invention, the improvement is connected to said one end of the cylinder.

Numerous other features, objects and advantages of the invention will become apparent from the following specification when read in connection with the accompanying drawing in which:

DETAILED DESCRIPTION OF PREFERRED EMBODIMENTS

Figure 1:
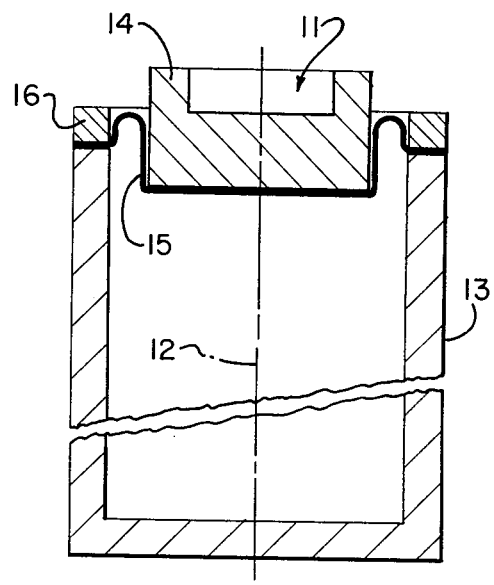
FIG. 1 is a longitudinal sectional view of an embodiment of the invention in which the floating member resides in the piston.

With reference now to the drawing and more particularly FIG. 1 thereof, there is shown a longitudinal sectional view of an embodiment of the invention in which a conventional air or gas spring includes a piston that carries a floating member 11 according to the invention that is restrained from movement in the direction along the axis 12 of cylinder 13 with very high stiffness while restrained from moving in a lateral direction orthogonal to axis 12 by significantly less stiffness, typically of the order of the stiffness resisting movement of piston 14 in the direction of axis 12 by the gas enclosed in cylinder 13 that is closed at one end and covered at the other by convoluted diaphragm seal 15 secured to the top of cylinder 13 by clamp 16 and carrying piston 14.

Figure 2:
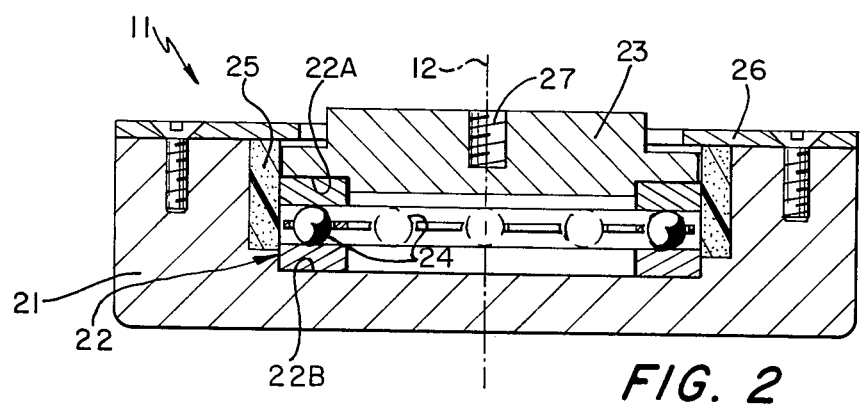
FIG. 2 is a diametrical sectional view of the piston insert.

Referring to FIG. 2, there is shown a diametrical sectional view of floating member 11 comprising a cup-like support member 21 that is seated in the top of piston 14 (FIG. 1). Support member 21 carries a thrust ball bearing 22 on which floating member 23 rides. Member 23 rides on caged harden balls, such as 24, arranged in a circle near its circumferential edge with the embracing races, such as 22A and 22B, also being flat and hardened to provide very low friction for lateral motion orthogonal to axis 12 while providing exceptionally high stiffness in the direction along axis 12. Floating member 23 abuts a surrounding annular elastomer member 25, typically foam tape $\frac{1}{4}''$ and $\frac{3}{4}''$ wide, such as 3M #4104 or equivalent, so that the horizontal stiffness of floating member 23 is essentially completely defined by the elastomer lateral constraint of member 25 with negligible nonlinearity caused by Coulomb or sliding friction. This makes the piston assembly particularly resistive to transmitting vibration disturbances with low inertia force level in a direction orthogonal to the axis which would otherwise be transmitted by friction.

An annular cover 26 may be screwed to member 21 as shown; however this member may be omitted. Floating member 23 is shown with a threaded opening 27 for securing floating member 23 to a body to be isolated when at the top of the assembly or to a base that is the source of vibration to be isolated.

Acording to another feature of the invention, the cavity in which floating member 23 is seated may be filled with highly viscous fluid to provide a viscous shear dampening action of floating member 23 in the piston assembly.

Figure 3:
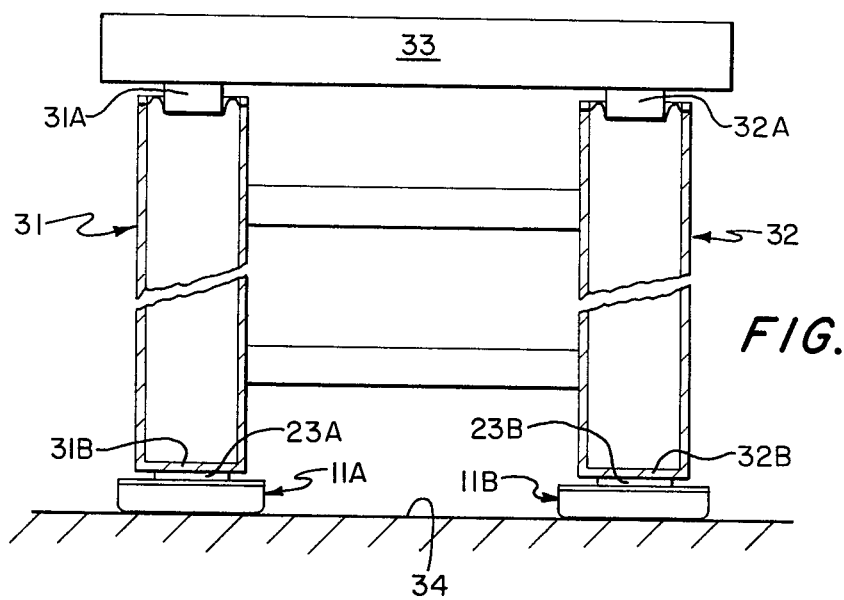
FIG. 3 is a diagrammatical representation partially in section of an alternative embodiment of the invention in which each floating member supports a gas spring and coacts therewith to form the legs of a table that is isolated from vibration in all directions.

Referring to FIG. 3, there is shown an alternative embodiment of the invention in which two pairs of prior-art air springs 31 and 32 are shown with piston 31A and 32A, respectively, supporting a table 33 to be isolated with the bottoms 31B and 32B, respectively, secured to floating members 23A and 23B, respectively, and inserts 11A and 11B of the type shown in FIG. 2 resting on the floor 34 or other surface subject to providing vibrational forces. Members 11A and 11B provide isolation from vibration having components generally parallel to floor 34 while conventional air or gas springs 31 and 32 provide isolation from vibration having components predominantly in a direction perpendicular to floor 34.

Typical values for vertical and horizontal stiffness in pounds per inch are one-tenth the static weight to be carried by an isolating support. Thus, for a 300 pound load, the stiffness is typically of the order of 30 pounds per inch. The vertical stiffness of the floating member relative to its support is nearly infinite. According to an alternative embodiment of the invention, the floating member may comprise or be supported by a rubber disc having somewhat less vertical stiffness that is still much higher than its effective horizontal stiffness in shear.

The invention is embodied in Model 1201 tables and Model 1205 platform commercially available from Kinetic Systems, Inc. of Waltham, Massachusetts, and the disclosure of these commercially available products is incorporated herein by reference.

There has been described novel apparatus and techniques for appreciably reducing vibration to insignificant levels. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. In a vibration isolation system having means for providing a high degree of vibration isolation along an axial direction greater than along a direction orthogonal to said axial direction the improvement comprising,
   a floating member means for significantly increasing isolation from vibration along said orthogonal direction,
   means for supporting said floating member means with high stiffness along said axial direction many times greater than the stiffness provided by said system along said axial direction,
   and means for restraining movement of said floating member means along said orthogonal direction with very low stiffness of the order of that provided by said system along said axial direction,
   said means for supporting comprising thrust bearings having hardened balls between flat surfaces of hardened races which flat surfaces are in planes orthogonal to said axial direction.

2. The improvement in accordance with claim 1 wherein said means for restraining comprises an elastomer abutting and surrounding said floating member means.

3. The improvement in accordance with claim 1 wherein said system comprises a metal cylinder with a rigid gas-tight closure at one end and a flexible convoluted diaphragm seal and piston at the other end and said improvement is seated in said piston.

4. The improvement in accordance with claim 1 wherein said system comprises a metal cylinder with a rigid gas-tight closure at one end and a flexible convoluted diaphragm seal and piston at the other end and said floating member means is rigidly connected to said one end.

* * * * *